(12) United States Patent
Callard et al.

(10) Patent No.: US 12,107,638 B2
(45) Date of Patent: Oct. 1, 2024

(54) PARAMETER SETTING

(71) Applicant: Telefonaktiebolaget LM Ericsson (publ), Stockholm (SE)

(72) Inventors: Aaron Callard, Ottawa (CA); Akram Bin Sediq, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 574 days.

(21) Appl. No.: 17/311,005

(22) PCT Filed: Dec. 13, 2018

(86) PCT No.: PCT/IB2018/060067
§ 371 (c)(1),
(2) Date: Jun. 4, 2021

(87) PCT Pub. No.: WO2020/121045
PCT Pub. Date: Jun. 18, 2020

(65) Prior Publication Data
US 2022/0021470 A1  Jan. 20, 2022

(51) Int. Cl.
*H04B 17/391* (2015.01)
*G06N 3/02* (2006.01)
(Continued)

(52) U.S. Cl.
CPC ............ *H04B 17/391* (2015.01); *G06N 3/02* (2013.01); *H04L 41/0843* (2013.01); *H04L 41/0886* (2013.01); *H04W 24/10* (2013.01)

(58) Field of Classification Search
CPC ........ H04B 17/391; G06N 3/02; G06N 3/045; G06N 5/01; G06N 20/10; G06N 20/20;
(Continued)

(56) References Cited

U.S. PATENT DOCUMENTS

| 2004/0176108 A1* | 9/2004 | Misikangas ........... H04W 64/00 455/423 |
| 2007/0160122 A1* | 7/2007 | Yoshida ................ H04L 1/0003 375/219 |

(Continued)

FOREIGN PATENT DOCUMENTS

| EP | 2782381 A1 | 9/2014 |
| KR | 20060100363 A * | 9/2006 |

(Continued)

OTHER PUBLICATIONS

International Search Report and Written Opinion dated Sep. 6, 2019 issued in PCT Application No. PCT/IB2018/060067, consisting of 19 pages.

(Continued)

*Primary Examiner* — Dinh Nguyen
(74) *Attorney, Agent, or Firm* — Sage Patent Group

(57) ABSTRACT

Apparatuses and methods are disclosed for parameter setting. In one embodiment, a method includes receiving a first signaling from the management node at the second hierarchical level, the first signaling corresponding to a first predetermined model; obtaining at least one local measurement value, the at least one local measurement value indicative of a local state of the wireless communication network; processing the at least one local measurement value based on the received first predetermined model to identify at least one parameter value independent of the management node; and managing local state of the wireless communication network by performing at least one predetermined action associated with the identified at least one parameter value.

19 Claims, 5 Drawing Sheets

(51) Int. Cl.
*H04L 41/08* (2022.01)
*H04L 41/084* (2022.01)
*H04W 24/10* (2009.01)

(58) Field of Classification Search
CPC ........... H04L 41/0843; H04L 41/0886; H04W 24/10; H04W 24/02
See application file for complete search history.

(56) References Cited

U.S. PATENT DOCUMENTS

| | | | | |
|---|---|---|---|---|
| 2009/0290555 | A1* | 11/2009 | Alpert | H04W 4/20 370/331 |
| 2010/0002603 | A1 | 1/2010 | Gupta et al. | |
| 2010/0317343 | A1* | 12/2010 | Krishnamurthy | H04L 5/005 455/435.1 |
| 2015/0262067 | A1* | 9/2015 | Sridhara | H04W 12/128 706/12 |
| 2018/0262394 | A1 | 9/2018 | Sakura et al. | |
| 2018/0317106 | A1 | 11/2018 | Konstantinou et al. | |

FOREIGN PATENT DOCUMENTS

| | | | | |
|---|---|---|---|---|
| WO | 2011/003008 A2 | 1/2011 | | |
| WO | WO-2018142266 A1 | * | 8/2018 | ............. G06F 16/35 |

OTHER PUBLICATIONS

Remco Litjens; et al. Self-Management for Unified Heterogeneous Radio Access Networks; IEEE 2013, consisting of 5 pages.

Panagis Magdalinos et al.; Feedback Based Learning for Self Managed Network Elements; IFIP/IEEE IM 2011: Poster Session, consisting of 4 pages.

NGMN Alliance; The Engine of Roadband Requirements; Wireless Innovation; NGMN Recommendation on Son & O&M Requirements; Dec. 5, 2008, consisting of 39 pages.

* cited by examiner

PARAMETER SETTING

CROSS-REFERENCE TO RELATED APPLICATIONS

This application is a Submission Under 35 U.S.C. § 371 for U.S. National Stage Patent Application of International Application Number: PCT/IB2018/060067, filed Dec. 13, 2018 entitled "PARAMETER SETTING," the entirety of which is incorporated herein by reference.

TECHNICAL FIELD

Network communication and in particular, methods and apparatuses for parameter setting such as network parameter setting.

BACKGROUND

Configuration of network parameters have been handled in many ways over the years. For example, Openflow, Netconf and OpenDaylight are examples of some high-level approaches that have been taken to provide configuration information to, for example, a network node. These approaches essentially monitor the network through various techniques and then change specific parameters based on internal algorithms. With such approaches, in order to specify parameters, for example, to specific users, flows, events, etc., information about those specific events, as well as, exact knowledge of the specified parameters should be known by the configurer (i.e., the node or device that configures the parameters).

However, such existing approaches can be problematic. For example, with existing approaches, the signaling overhead can grow with the number of parameters to be configured as well as the amount of feedback required in order for the configurer to know what parameters should be set and/or how to set the parameters for network optimization.

Additionally, the round trip delay from getting feedback once the parameters have been applied using the application can cause any decisions that could be made by the configurer to be potentially applied too late to be useful.

SUMMARY

Some embodiments advantageously provide methods and system for parameter setting that may reduce signaling overhead, delays and/or processing load.

According to one aspect of the present disclosure, a communication device configured to communicate with a management node over a wireless communication network is provided. The communication device implements a management function including automated parameter setting at a first hierarchical level of the wireless communication network independent of the management node at a second hierarchical level of the wireless communication network, the second hierarchical level being a higher level than the first hierarchical level. The communication device includes a communication interface configured to receive a first signaling from the management node at the second hierarchical level, the first signaling corresponding to a first predetermined model. The communication device includes processing circuitry in communication with the communication interface, the processing circuitry configured to obtain at least one local measurement value, the at least one local measurement value indicative of a local state of the wireless communication network; process the at least one local measurement value based on the received first predetermined model to identify at least one parameter value independent of the management node; and manage the local state of the wireless communication network by performing at least one predetermined action associated with the identified at least one parameter value.

In some embodiments of this aspect, the first predetermined model maps a predetermined set of measurement values to a predetermined set of parameter values. In some embodiments of this aspect, the processing circuitry is further configured to process the at least one local measurement value by being configured to process the at least one local measurement value based on the mapping of the predetermined set of measurement values to the predetermined set of parameter values in the received first predetermined model to identify the at least one parameter value independent of the management node. In some embodiments of this aspect, the at least one predetermined action includes setting at least one corresponding parameter to the identified at least one parameter value. In some embodiments of this aspect, the at least one predetermined action includes triggering at least one of a remote procedure call, a second predetermined model and communication of an alarm. In some embodiments of this aspect, the communication interface is further configured to receive a second signaling, from the management node, the second signaling corresponding to a second predetermined model, the second predetermined model based on a re-evaluation of the first predetermined model. In some embodiments of this aspect, the second signaling is different from the first signaling and the second predetermined model is different from the first predetermined model.

In some embodiments of this aspect, the processing circuitry is further configured to continue to manage the local state of the wireless communication network by setting parameters to parameter values identified independent of the management node and based on the mapping in the first predetermined model until a second predetermined model is received, the second predetermined model being a re-evaluated parameter setting model. In some embodiments of this aspect, the processing circuitry is further configured to, as a result of a second predetermined model being received, manage the local state of the wireless communication network by setting one or more parameter to corresponding parameter values based on a mapping of a predetermined set of measurement values to a predetermined set of parameter values in the received second predetermined model. In some embodiments of this aspect, the first predetermined model is configured to provide at least one output out of a plurality of predetermined outputs based on at least one input. In some embodiments of this aspect, the at least one input is the obtained at least one local measurement value and the at least one output is the at least one parameter value identified independent of the management node. In some embodiments of this aspect, the first predetermined model is based on at least one machine learning model. In some embodiments of this aspect, the at least one machine learning model includes at least one of a decision tree, a random forest, a neural network, a support vector machine, a k-nearest neighbor and a logistic regression. In some embodiments of this aspect, the at least one machine learning model maps a predetermined set of measurement values to a predetermined set of parameter values, the mapping generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model.

In some embodiments of this aspect, the first predetermined model is represented by a look-up table. In some embodiments of this aspect, the first predetermined model is received as a result of a model evaluation trigger, the model evaluation trigger being at least one of: a time out condition of a periodic timer; a state change of the wireless communication network; and a remote procedure call. In some embodiments of this aspect, the at least one local measurement value includes a channel quality measurement value and the identified at least one parameter value is associated with a performance measurement value. In some embodiments of this aspect, the at least one parameter value includes at least one of a target block error rate value, a radio resource management parameter value and a managed object model parameter value. In some embodiments of this aspect, the communication device at the first hierarchical level is a wireless device. In some embodiments of this aspect, the communication device at the first hierarchical level is a network node. In some embodiments of this aspect, the first signaling is received in at least one of a Radio Resource Control, RRC, message and a control plane interface message.

According to another aspect of the present disclosure, a method for a communication device configured to communicate with a management node over a wireless communication network is provided. The communication device implements a management function including automated parameter setting at a first hierarchical level of the wireless communication network independent of the management node at a second hierarchical level of the wireless communication network. The second hierarchical level is a higher level than the first hierarchical level. The method includes receiving a first signaling from the management node at the second hierarchical level, the first signaling corresponding to a first predetermined model; obtaining at least one local measurement value, the at least one local measurement value indicative of a local state of the wireless communication network; processing the at least one local measurement value based on the received first predetermined model to identify at least one parameter value independent of the management node; and managing the local state of the wireless communication network by performing at least one predetermined action associated with the identified at least one parameter value.

In some embodiments of this aspect, the first predetermined model maps a predetermined set of measurement values to a predetermined set of parameter values. In some embodiments of this aspect, the processing the at least one local measurement value further comprises processing the at least one local measurement value based on the mapping of the predetermined set of measurement values to the predetermined set of parameter values in the received first predetermined model to identify the at least one parameter value independent of the management node. In some embodiments of this aspect, the at least one predetermined action includes setting at least one corresponding parameter to the identified at least one parameter value. In some embodiments of this aspect, the at least one predetermined action includes triggering at least one of a remote procedure call, a second predetermined model and communication of an alarm. In some embodiments of this aspect, the method further includes receiving a second signaling, from the management node, the second signaling corresponding to a second predetermined model, the second predetermined model based on a re-evaluation of the first predetermined model. In some embodiments of this aspect, the second signaling is different from the first signaling and the second predetermined model is different from the first predetermined model. In some embodiments of this aspect, the managing the local state of the wireless communication network further comprises setting parameters to parameter values identified independent of the management node and based on the mapping in the first predetermined model until a second predetermined model is received, the second predetermined model being a re-evaluated parameter setting model. In some embodiments of this aspect, the method further includes, as a result of a second predetermined model being received, managing the local state of the wireless communication network by setting one or more parameter to corresponding parameter values based on a mapping of a predetermined set of measurement values to a predetermined set of parameter values in the received second predetermined model.

In some embodiments of this aspect, the first predetermined model is configured to provide at least one output out of a plurality of predetermined outputs based on at least one input. In some embodiments of this aspect, the at least one input is the obtained at least one local measurement value and the at least one output is the at least one parameter value identified independent of the management node. In some embodiments of this aspect, the first predetermined model is based on at least one machine learning model. In some embodiments of this aspect, the at least one machine learning model includes at least one of a decision tree, a random forest, a neural network, a support vector machine, a k-nearest neighbor and a logistic regression. In some embodiments of this aspect, the at least one machine learning model maps a predetermined set of measurement values to a predetermined set of parameter values, the mapping generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model. In some embodiments of this aspect, the first predetermined model is represented by a look-up table.

In some embodiments of this aspect, the first predetermined model is received as a result of a model evaluation trigger, the model evaluation trigger being at least one of: a time out condition of a periodic timer; a state change of the wireless communication network; and a remote procedure call. In some embodiments of this aspect, the at least one local measurement value includes a channel quality measurement value and the identified at least one parameter value is associated with a performance measurement value. In some embodiments of this aspect, the at least one parameter value includes at least one of a target block error rate value, a radio resource management parameter value and a managed object model parameter value. In some embodiments of this aspect, the communication device at the first hierarchical level is a wireless device. In some embodiments of this aspect, the communication device at the first hierarchical level is a network node. In some embodiments of this aspect, the first signaling is received in at least one of a Radio Resource Control, RRC, message and a control plane interface message.

According to another aspect of this disclosure, a management node at a second hierarchical level configured to communicate with a communication device at a first hierarchical level over a wireless communication network is provided. The second hierarchical level is higher than the first hierarchical level. The management node includes a communication interface configured to communicate a first signaling to the communication device at the first hierarchical level, the first signaling corresponding to a first predetermined model; and processing circuitry in communication with the communication interface, the processing circuitry configured to manage a global state of the wireless communication network by generating the first predetermined model, the first predetermined model mapping a predetermined set of measurement values to a predetermined set of parameter values.

In some embodiments of this aspect, the processing circuitry is further configured to generate a second predetermined model based at least in part on a re-evaluation of the first predetermined model. In some embodiments of this aspect, the communication interface is configured to communicate the second predetermined model to the communication device at the first hierarchical level. In some embodiments of this aspect, the second predetermined model is different from the first predetermined model. In some embodiments of this aspect, the mapping of the predetermined set of measurement values to the predetermined set of parameter values in the first predetermined model is configured to permit the communication device to set at least one local parameter to at least one parameter value from the predetermined set of parameter values independent of the management node. In some embodiments of this aspect, the first predetermined model is configured to provide at least one output out of a plurality of predetermined outputs based on at least one input, the at least one input corresponding to at least one of the predetermined set of measurement values and the at least one output corresponding to at least one of the predetermined set of parameter values. In some embodiments of this aspect, the first predetermined model is based on at least one machine learning model. In some embodiments of this aspect, the at least one machine learning model includes at least one of a decision tree, a random forest, a neural network, a support vector machine, a k-nearest neighbor and a logistic regression.

In some embodiments of this aspect, the mapping of the predetermined set of measurement values to the predetermined set of parameter values in the first predetermined model is generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model. In some embodiments of this aspect, the first predetermined model is communicated to the communication device as a result of a model evaluation trigger, the model evaluation trigger being at least one of: a time out condition of a periodic timer; a state change of the wireless communication network; and a remote procedure call. In some embodiments of this aspect, the predetermined set of measurement values includes predetermined channel quality measurement values and the predetermined set of parameter values includes predetermined performance measurement values. In some embodiments of this aspect, the predetermined performance measurement values include at least one of target block error rate values, radio resource management parameter values and managed object model parameter values. In some embodiments of this aspect, the management node is a network node. In some embodiments of this aspect, the first signaling is communicated in a Radio Resource Control, RRC, message and a control plane interface message.

According to yet another aspect of this disclosure, a method for a management node at a second hierarchical level configured to communicate with a communication device at a first hierarchical level over a wireless communication network is provided. The second hierarchical level is higher than the first hierarchical level. The method includes communicating a first signaling to the communication device at the first hierarchical level, the first signaling corresponding to a first predetermined model; and managing a global state of the wireless communication network by generating the first predetermined model, the first predetermined model mapping a predetermined set of measurement values to a predetermined set of parameter values.

In some embodiments of this aspect, the method further includes generating a second predetermined model based at least in part on a re-evaluation of the first predetermined model. In some embodiments of this aspect, the method further includes communicating the second predetermined model to the communication device at the first hierarchical level. In some embodiments of this aspect, the second predetermined model is different from the first predetermined model. In some embodiments of this aspect, the mapping of the predetermined set of measurement values to the predetermined set of parameter values in the first predetermined model is configured to permit the communication device to set at least one local parameter to at least one parameter value from the predetermined set of parameter values independent of the management node. In some embodiments of this aspect, the first predetermined model is configured to provide at least one output out of a plurality of predetermined outputs based on at least one input, the at least one input corresponding to at least one of the predetermined set of measurement values and the at least one output corresponding to at least one of the predetermined set of parameter values. In some embodiments of this aspect, the first predetermined model is based on at least one machine learning model.

In some embodiments of this aspect, the at least one machine learning model includes at least one of a decision tree, a random forest, a neural network, a support vector machine, a k-nearest neighbor and a logistic regression. In some embodiments of this aspect, the mapping of the predetermined set of measurement values to the predetermined set of parameter values in the first predetermined model is generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model. In some embodiments of this aspect, the first predetermined model is communicated to the communication device as a result of a model evaluation trigger, the model evaluation trigger being at least one of: a time out condition of a periodic timer; a state change of the wireless communication network; and a remote procedure call. In some embodiments of this aspect, the predetermined set of measurement values includes predetermined channel quality measurement values and the predetermined set of parameter values includes predetermined performance measurement values. In some embodiments of this aspect, the predetermined performance measurement values include at least one of target block error rate values, radio resource management parameter values and managed object model parameter values. In some embodiments of this aspect, the management node is a network node. In some embodiments of this aspect, the first signaling is communicated in a Radio Resource Control, RRC, message and a control plane interface message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
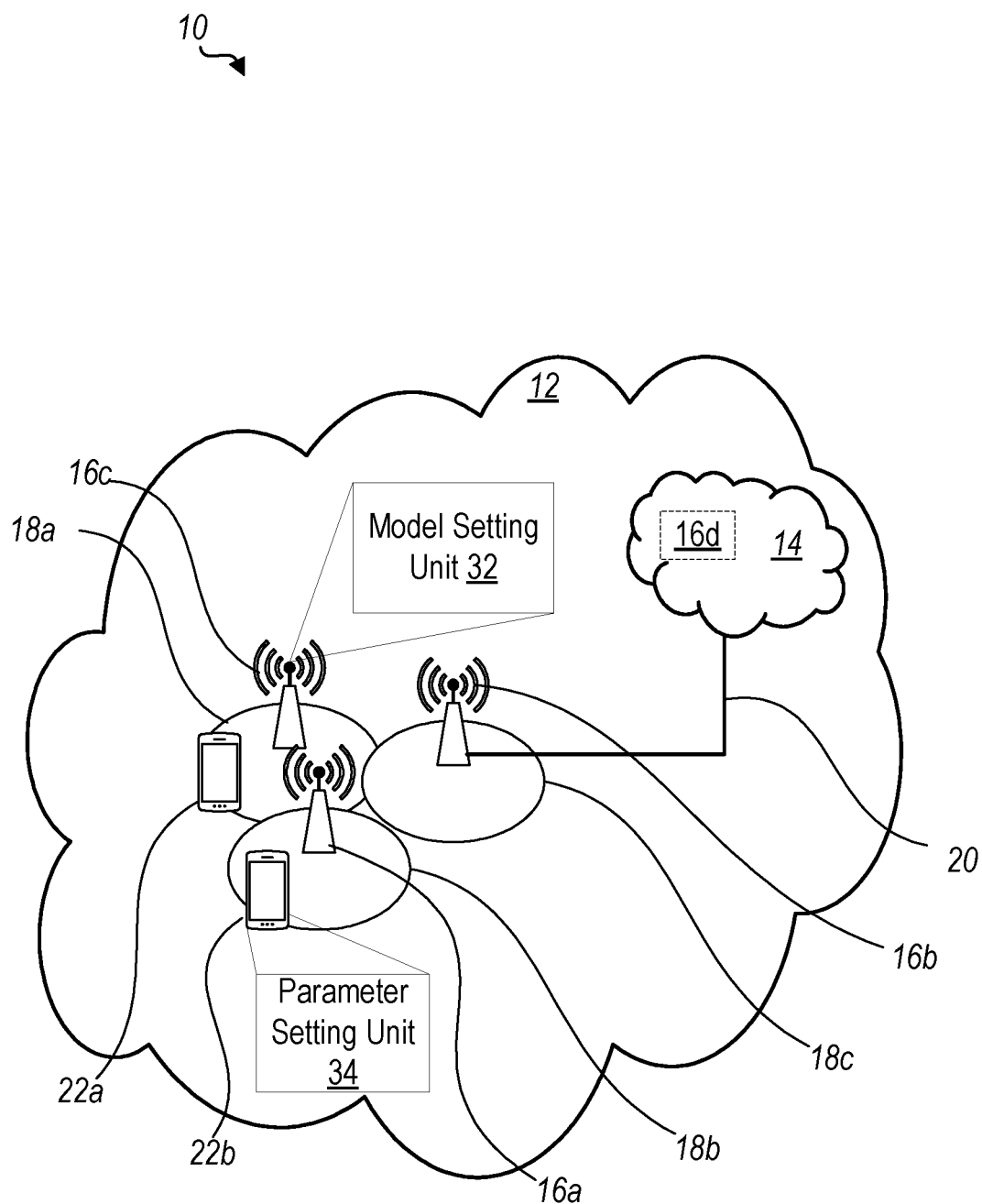
FIG. 1 is a schematic diagram of an example network architecture illustrating a communication system connected via an intermediate network to a host computer according to the principles in the present disclosure.

Some embodiments of the present disclosure include providing for a 'meta' layer of parameter setting to be used. This 'meta' layer can allow different parameters to be set based on other observed parameters. In other words, some embodiments of this disclosure permit the configurer (e.g., configuration or management node, etc.) to communicate to a communication device (e.g., communication device, base station, etc.) to be configured an indication or model informing the communication device that if it observes, i.e., determines the occurrence of, X (e.g., local measurement), do Y (e.g., set parameter autonomously to a particular value based on observed X).

In some embodiments, the models can be trained, signaled and specified using configuration techniques, including known configuration channels.

Some embodiments of this disclosure advantageously allow for greater control of fine-grained parameters without large signaling, high processing load, or large delay, as compared to existing parameter setting techniques.

Some embodiments of this disclosure may allow operators' requirements to be satisfied for configurability, without forcing a high processing burden on the operator devices/products.

Some embodiments of this disclosure enable a client layer (e.g., a radio access network (RAN) control plane) to implement policies and RAN management functionality with less signaling overhead than is required with a conventional arrangement in which "measurements" indicative of a state of the RAN must be signaled to the client layer, and management decisions (based on those measurements) must be signaled by the client layer to RAN nodes. Accordingly, some embodiments of this disclosure reduce signaling overhead associated with existing systems for RAN management.

Some embodiments of this disclosure introduce a framework that allows for very fine-tuned configurability of RAN parameters, without introducing significant signaling overhead.

Some embodiments of this disclosure provide for a method in a management system or node and/or a management node configured to manage a Radio Access Network (RAN) according to the method, the method including, for example:

receiving, from another management node (MN), a predefined model configured to map a predetermined set of one or more measurements to a predetermined set of one or more parameters; and thereafter:
 receiving, from at least one network element of the RAN (e.g., base station, communication device), one or more measurement values indicative of a state of the RAN;
 processing the received measurement values in accordance with the predefined model to generate one or more parameter values; and
 managing the RAN in accordance with the generated one or more parameter values.

In some embodiments of this disclosure, the "model" can include, or be represented by, or be generated from, e.g. a decision tree, a look-up table, a neural network, etc.) and can be derived by any suitable means (e.g., manually compiled, machine learning, etc.).

Existing methods of parameter setting for managing a network (e.g., RAN) are not concerned with reducing management signaling overhead. More particularly, such existing systems do not provide for reducing management signaling overhead by means of an arrangement in which a network node (which may be either a network management system node, or an element management system node, or a communication device improved according to the techniques in this disclosure) receives a decision model from another management node (e.g., associated with a network operator) and subsequently manages the RAN in accordance with the received decision model. Thus, techniques provided in this disclosure can reduce signaling overhead associated with higher level parameter setting-related signaling and/or delays associated with such multi-level feedback-command-type communications.

Before describing in detail example embodiments, it is noted that the embodiments reside primarily in combinations of apparatus components and processing steps related to parameter setting for a wireless communication network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "management node" used herein can be any kind of management node, such as a network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, a gateway node, an application residing in a UE or upper layer processing component etc.), an external node (e.g., 3rd party node, a node external to the current network), nodes in distributed antenna system (DAS), a spectrum access system (SAS) node, an element management system (EMS), etc. The management node may also comprise test equipment. The term "radio node" used herein may be used to also denote a communication device (CD) such as a communication device (CD) or a radio network node.

In some embodiments, a communication device herein can be any type of communication device capable of communicating with a management node or another communication device over radio signals, such as wireless device (WD). The non-limiting terms wireless device (WD) or a user equipment (UE) may be used herein interchangeably. The communication device may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. In some embodiments, the communication device may be a network node, such as a base station, a radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc.

In some embodiments, the term "communication device" and "management node" may be used to differentiate between a lower hierarchical level device (the communication device) whose parameters are to be set by at least one higher hierarchical level node (the management node), according to the techniques described in this disclosure. In some embodiments, as used herein, the term "hierarchical level" may indicate a particular level of a device or a node in a multi-level communication network, such as, a wireless communication network (e.g., RAN). In some embodiments, a lower hierarchical level may be considered closer to a user plane than a higher hierarchical level, which higher hierarchical level may be configured to manage devices or nodes at the lower hierarchical level(s). For example, in one embodiment, a base station may be at a lower hierarchical level while an Open Network Automation Platform (ONAP) system or a gateway node may be configured according to the techniques in this disclosure to manage base station(s) at the lower hierarchical level. In another embodiment, a UE may be at a lower hierarchical level while a base station or a gateway node may be at the higher hierarchical level configured to manage UEs at the lower hierarchical level(s) according to the techniques in this disclosure. Thus, advantageously, signaling overhead, delay and/or processing load can be reduced in a multi-level communication network, while still permitting very fine-tuned parameter settings to optimize the network according to at least some of the techniques in this disclosure.

In some embodiments, the disclosure may use the terms "hierarchical level," "level," and "layer" interchangeably, for the sake of brevity.

In some embodiments, the term "measurement" as used herein may be considered an assignment of a number/value to an observable characteristic of a property, feature, factor, and/or object affecting the performance of a network. In some embodiments, the measurement value may be stored in an observable memory structure that can be referenced by the upper layer nodes. Examples of measurements include, in different contexts, Performance Measurement (PM) counters, fed back values over the air (e.g., channel quality index (CQI), reference signal received power (RSRP) values (Layer 2 or layer 3), pre-coding matrix indicator (PMI), Rank Indicators, etc.), coverage, quality and/or capacity indicators, such as key performance indicators (KPIs), resource utilization measures, buffers sizes measurements, etc. In some embodiments, the measurements may be local measurements performed by a lower layer node.

In some embodiments, the term "parameter" as used herein may be considered a variable that is given a specific value that can define an aspect of a system or network and/or sets the condition of the system or network's operation. In some embodiments, the parameter may be configurable by the upper layers (e.g., CQI periodicity, transmission mode, carrier to be used, data priority, etc.). In some embodiments of this disclosure, the techniques provided may allow the lower layers to configure and/or set the parameters based on a model provided by the upper layers.

In some embodiments the techniques provided may allow the lower layers to trigger the sending of messages or triggering of functions based on evaluation of a model provided by upper layers. For example, raising an alarm when several different measurements jointly pass a particular threshold, or triggering evaluation of another model when certain model criteria are met.

The term "signaling" used herein may comprise any of: high-layer signaling (e.g., via Radio Resource Control (RRC) or higher layers, management systems, element managers), lower-layer signaling (e.g., via a physical control channel or a broadcast channel, wireline packet reception (IP/ethernet)), or a combination thereof. The signaling may be implicit or explicit. The signaling may further be unicast, multicast or broadcast. The signaling may also be directly to another node or via a third node. In some embodiments, the term "signaling" may be used to indicate a transmission of information and/or data from one node to another node within and/or via a network.

In some embodiments, the term "model" as used herein may indicate a representation of a relationship between specific measurement values and parameter values, which model may be predetermined by a higher level node and signaled to a lower level node to be used by the lower level node to set parameters.

In some embodiments the generic term "radio network node" can be used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a communication device or a management node may be distributed over a plurality of communication devices and/or management nodes. In other words, it is contemplated that the functions of the management node and communication device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of management nodes 16a, 16b, 16c, 16d (referred to collectively as management nodes 16), such as NBs, eNBs, gNBs or other types of wireless access points, each defining a corresponding coverage area 18a, 18b, 18c (referred to collectively as coverage areas 18). Each management node 16a, 16b, 16c is connectable to the core network 14 over a wired or wireless connection 20. A first communication device (WD) 22a located in coverage area 18a is configured to wirelessly connect to, or be paged by, the corresponding management node 16c. A second communication device 22b in coverage area 18b is wirelessly connectable to the corresponding management node 16a. While a plurality of communication devices 22a, 22b (collectively referred to as communication devices 22) are illustrated in this example, the disclosed embodiments are equally applicable to a situation where a sole communication device 22 is in the coverage area or where a sole communication device 22 is connecting to the corresponding management node 16. Note that although only two communication devices 22 and three management nodes 16 are shown for convenience, the communication system may include many more communication devices 22 and management nodes 16.

Also, it is contemplated that a communication device 22 can be in simultaneous communication and/or configured to separately communicate with more than one management node 16 and more than one type of management node 16. For example, a communication device 22 can have dual connectivity with a management node 16 that supports LTE and the same or a different management node 16 that supports NR. As an example, communication device 22 can be in communication with an eNB for LTE/E-UTRAN and a gNB for NR/NG-RAN.

In some embodiments, the management node 16, such as management node 16d, may be part of the core network 14, rather than an NB or other type of base station or network element. In some embodiments, the management node 16 may be, for example, an ONAP system configured to manage and/or optimize the network and/or network parameters, according to the techniques described in this disclosure. In such embodiments, the communication device 22 may be an NB or other type of base station or network element (instead of a wireless device) to be configured e.g., by the management node 16, which may, in such embodiments, be a higher level configurer, such an, an ONAP or a gateway node or other management node in the core network 14, for example.

A management node 16 is configured to include a model setting unit 32 which is configured to cause a communication interface 42 to communicate a first signaling to the communication device 22 at the first hierarchical level, the first signaling corresponding to a first predetermined model. The model setting unit 32 is configured to manage a global state of the wireless communication network by generating the first predetermined model, the first predetermined model mapping a predetermined set of measurement values to a predetermined set of parameter values.

A communication device 22 is configured to include a parameter setting unit 34 which is configured to cause a communication interface 62 to receive a first signaling from the management node 16 at the second hierarchical level, the first signaling corresponding to a first predetermined model. The parameter setting unit 34 may be configured to: obtain at least one local measurement value, the at least one local measurement value indicative of a local state of the wireless communication network; process the at least one local measurement value based on the received first predetermined model to identify at least one parameter value independent of the management node 16; and manage the local state of the wireless communication network by performing at least one predetermined action associated with the identified at least one parameter value.

Example implementations, in accordance with an embodiment, of the communication device 22 and the management node 16 discussed in the preceding paragraphs will now be described with reference to FIG. 2. In a communication system 10, a management node 16 may include hardware 40 enabling the management node 16 to communicate with the communication device 22. The hardware 40 may include a communication interface 42 for setting up and maintaining a wired and/or wireless connection 44 with an interface of a different communication device of the communication system 10. The communication interface 42 may include a radio interface for setting up and maintaining at least a wireless connection with the communication device 22 managed by the management node 16. The radio interface may be formed as or may include, for example, one or more RF transmitters, one or more RF receivers, and/or one or more RF transceivers. The communication interface 42 may be configured to facilitate the connection 44 to the communication device 22. The connection 44 may be direct or it may pass through a core network 14 of the communication system 10 and/or through one or more intermediate networks outside the communication system 10.

In the embodiment shown, the hardware 40 of the management node 16 further includes processing circuitry 46. The processing circuitry 46 may include a processor 48 and a memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) the memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the management node 16 further has software 52 stored internally in, for example, memory 50, or stored in external memory (e.g., database, storage array, network storage device, etc.) accessible by the management node 16 via an external connection. The software 52 may be executable by the processing circuitry 46. The processing circuitry 46 may be configured to control any of the methods and/or processes described herein and/or to cause such methods, and/or processes to be performed, e.g., by management node 16. Processor 48 corresponds to one or more processors 48 for performing management node 16 functions described herein. The memory 50 is configured to store data, programmatic software code and/or other information described herein. In some embodiments, the software 52 may include instructions that, when executed by the processor 48 and/or processing circuitry 46, causes the processor 48 and/or processing circuitry 46 to perform the processes described herein with respect to management node 16. For example, the processing circuitry 46 of the management node 16 may include a model setting unit 32 configured to cause a communication interface 42 to communicate a first signaling to the communication device 22 at the first hierarchical level, the first signaling corresponding to a first predetermined model. The model setting unit 32 is configured to manage a global state of the wireless communication network by generating the first predetermined model, the first predetermined model mapping a predetermined set of measurement values to a predetermined set of parameter values.

In some embodiments, the processing circuitry 46 is further configured to generate a second predetermined model based at least in part on a re-evaluation of the first predetermined model. In some embodiments, the communication interface 42 is configured to communicate the second predetermined model to the communication device 22 at the first hierarchical level. In some embodiments, the second predetermined model is different from the first predetermined model. In some embodiments, the mapping of the predetermined set of measurement values to the predetermined set of parameter values in the first predetermined model is configured to permit the communication device 22 to set at least one local parameter to at least one parameter value from the predetermined set of parameter values independent of the management node 16. In some embodiments, the first predetermined model is configured to provide at least one output out of a plurality of predetermined outputs based on at least one input, the at least one input corresponding to at least one of the predetermined set of measurement values and the at least one output corresponding to at least one of the predetermined set of parameter values. In some embodiments, the first predetermined model is based on at least one machine learning model. In some embodiments, the at least one machine learning model includes at least one of a decision tree, a random forest, a neural network, a support vector machine, a k-nearest neighbor and a logistic regression.

In some embodiments, the mapping of the predetermined set of measurement values to the predetermined set of parameter values in the first predetermined model is generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model. In some embodiments, the first predetermined model is communicated to the communication device 22 as a result of a model evaluation trigger, the model evaluation trigger being at least one of: a time out condition of a periodic timer; a state change of the wireless communication network; and a remote procedure call. In some embodiments, the predetermined set of measurement values includes predetermined channel quality measurement values and the predetermined set of parameter values includes predetermined performance measurement values. In some embodiments, the predetermined performance measurement values include at least one of target block error rate values, radio resource management parameter values and managed object model parameter values. In some embodiments, the management node 16 is a network node. In some embodiments, the first signaling is communicated in a Radio Resource Control, RRC, message and a control plane interface message (e.g., NG-c protocol message).

The communication system 10 further includes the communication device 22 already referred to. The communication device 22 may have hardware 60 that may include a communication interface 62. The communication interface 62 may be configured to set up and maintain a wired and/or wireless connection 44 with a management node 16. In some embodiments, control plane communications may be performed over the connection 44 between the management node 16 and the communication device 22 according to the principles of this disclosure. For example, the control plane communications may include signaling the model from the management node 16 to the communication device 22. The communication interface 62 may be configured for setting up and maintaining a wired connection with an interface of a different communication device of the communication system 10. The communication interface 62 may include a radio interface that may be formed as or may include, for example, one or more RF transmitters, one or more RF receivers, and/or one or more RF transceivers.

The hardware 60 of the communication device 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the communication device 22 may further comprise software 70, which is stored in, for example, memory 68 at the communication device 22, or stored in external memory (e.g., database, storage array, network storage device, etc.) accessible by the communication device 22. The software 70 may be executable by the processing circuitry 64. The processing circuitry 64 may be configured to control any of the methods and/or processes described herein and/or to cause such methods, and/or processes to be performed, e.g., by communication device 22. The processor 66 corresponds to one or more processors 66 for performing communication device 22 functions described herein. The communication device 22 includes memory 68 that is configured to store data, programmatic software code and/or other information described herein. In some embodiments, the software 70 may include instructions that, when executed by the processor 66 and/or processing circuitry 64, causes the processor 66 and/or processing circuitry 64 to perform the processes described herein with respect to communication device 22. For example, the processing circuitry 64 includes a parameter setting unit 34 configured to cause a communication interface 62 to receive a first signaling from the management node 16 at the second hierarchical level, the first signaling corresponding to a first predetermined model. The parameter setting unit 34 may be configured to obtain at least one local measurement value, the at least one local measurement value indicative of a local state of the wireless communication network; process the at least one local measurement value based on the received first predetermined model to identify at least one parameter value independent of the management node 16; and manage the local state of the wireless communication network by performing at least one predetermined action associated with the identified at least one parameter value.

In some embodiments, the first predetermined model maps a predetermined set of measurement values to a predetermined set of parameter values. In some embodiments, the processing circuitry 64 is further configured to process the at least one local measurement value by being configured to process the at least one local measurement value based on the mapping of the predetermined set of measurement values to the predetermined set of parameter values in the received first predetermined model to identify the at least one parameter value independent of the management node 16. In some embodiments, the at least one predetermined action includes setting at least one corresponding parameter to the identified at least one parameter value. In some embodiments, the at least one predetermined action includes triggering at least one of a remote procedure call, a second predetermined model and communication of an alarm. In some embodiments, the communication interface 62 is further configured to receive a second signaling, from the management node 16, the second signaling corresponding to a second predetermined model, the second predetermined model based on a re-evaluation of the first predetermined model. In some embodiments, the second signaling is different from the first signaling and the second predetermined model is different from the first predetermined model.

In some embodiments, the processing circuitry 64 is further configured to continue to manage the local state of the wireless communication network by setting parameters to parameter values identified independent of the management node 16 and based on the mapping in the first predetermined model until a second predetermined model is received, the second predetermined model being a re-evaluated parameter setting model. In some embodiments, the processing circuitry 64 is further configured to, as a result of a second predetermined model being received, manage the local state of the wireless communication network by setting one or more parameter to corresponding parameter values based on a mapping of a predetermined set of measurement values to a predetermined set of parameter values in the received second predetermined model. In some embodiments, the first predetermined model is configured to provide at least one output out of a plurality of predetermined outputs based on at least one input. In some embodiments, the at least one input is the obtained at least one local measurement value and the at least one output is the at least one parameter value identified independent of the management node 16. In some embodiments, the first predetermined model is based on at least one machine learning model. In some embodiments, the at least one machine learning model includes at least one of a decision tree, a random forest, a neural network, a support vector machine, a k-nearest neighbor and a logistic regression. In some embodiments, the at least one machine learning model maps a predetermined set of measurement values to a predetermined set of parameter values, the mapping generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model.

In some embodiments, the first predetermined model is represented by a look-up table. In some embodiments, the first predetermined model is received as a result of a model evaluation trigger, the model evaluation trigger being at least one of: a time out condition of a periodic timer; a state change of the wireless communication network; and a remote procedure call. In some embodiments, the at least one local measurement value includes a channel quality measurement value and the identified at least one parameter value is associated with a performance measurement value. In some embodiments, the at least one parameter value includes at least one of a target block error rate value, a radio resource management parameter value and a managed object model parameter value. In some embodiments, the communication device 22 at the first hierarchical level is a wireless device. In some embodiments, the communication device 22 at the first hierarchical level is a network node. In some embodiments, the first signaling is received in at least one of a Radio Resource Control, RRC, message and a control plane interface message.

Figure 2:
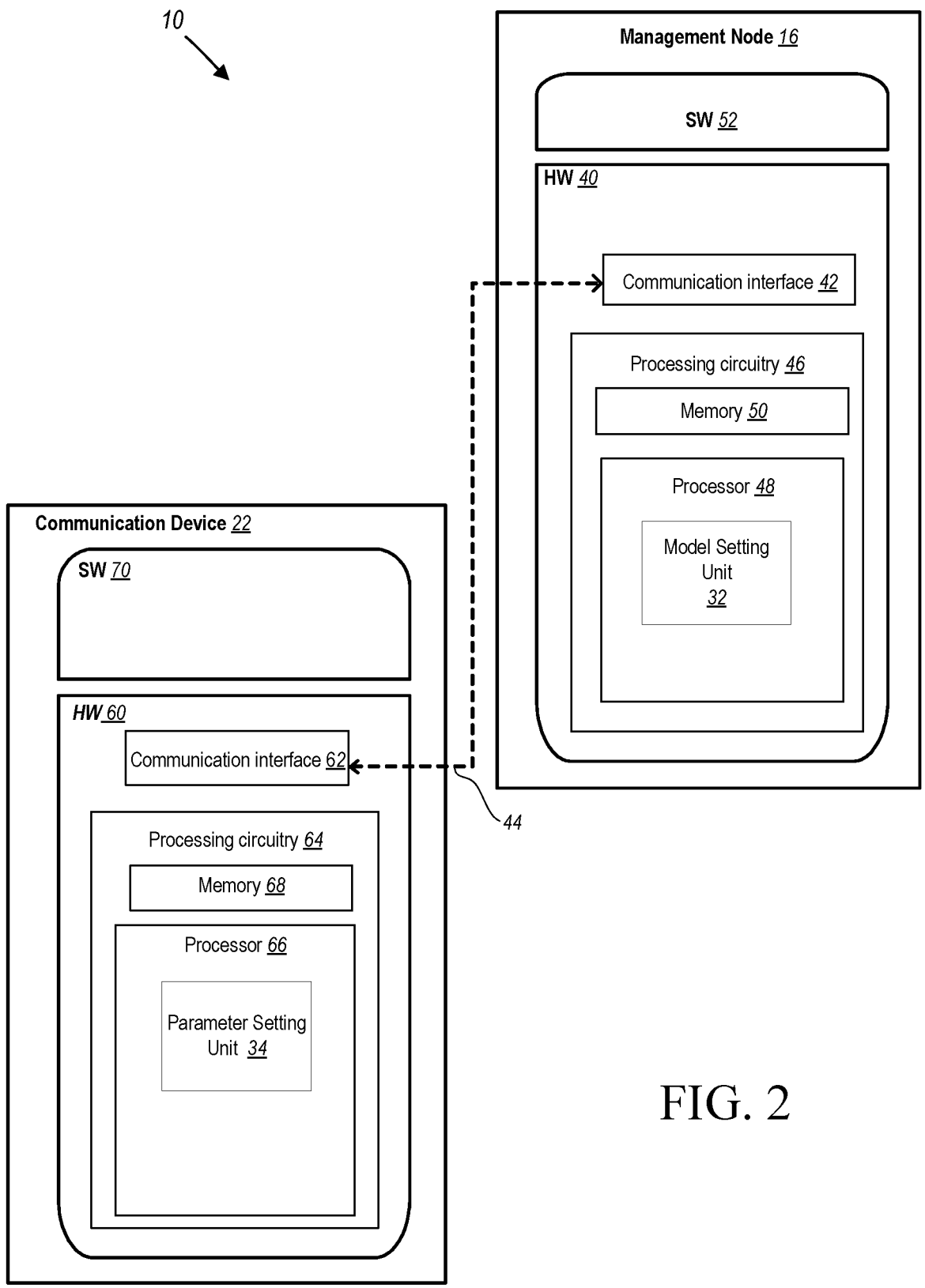
FIG. 2 is a block diagram of a management node with a communication device over an at least partially wireless connection according to some embodiments of the present disclosure.

In some embodiments, the inner workings of the management node 16 and communication device 22, may be as shown in FIG. 2 and independently, the surrounding network topology may be that of FIG. 1.

In FIG. 2, the wired and/or wireless connection 44 between the communication device 22 and the management node 16 is in accordance with the teachings of the embodiments described throughout this disclosure. Although FIGS. 1 and 2 show various "units" such as model setting unit 32, and parameter setting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
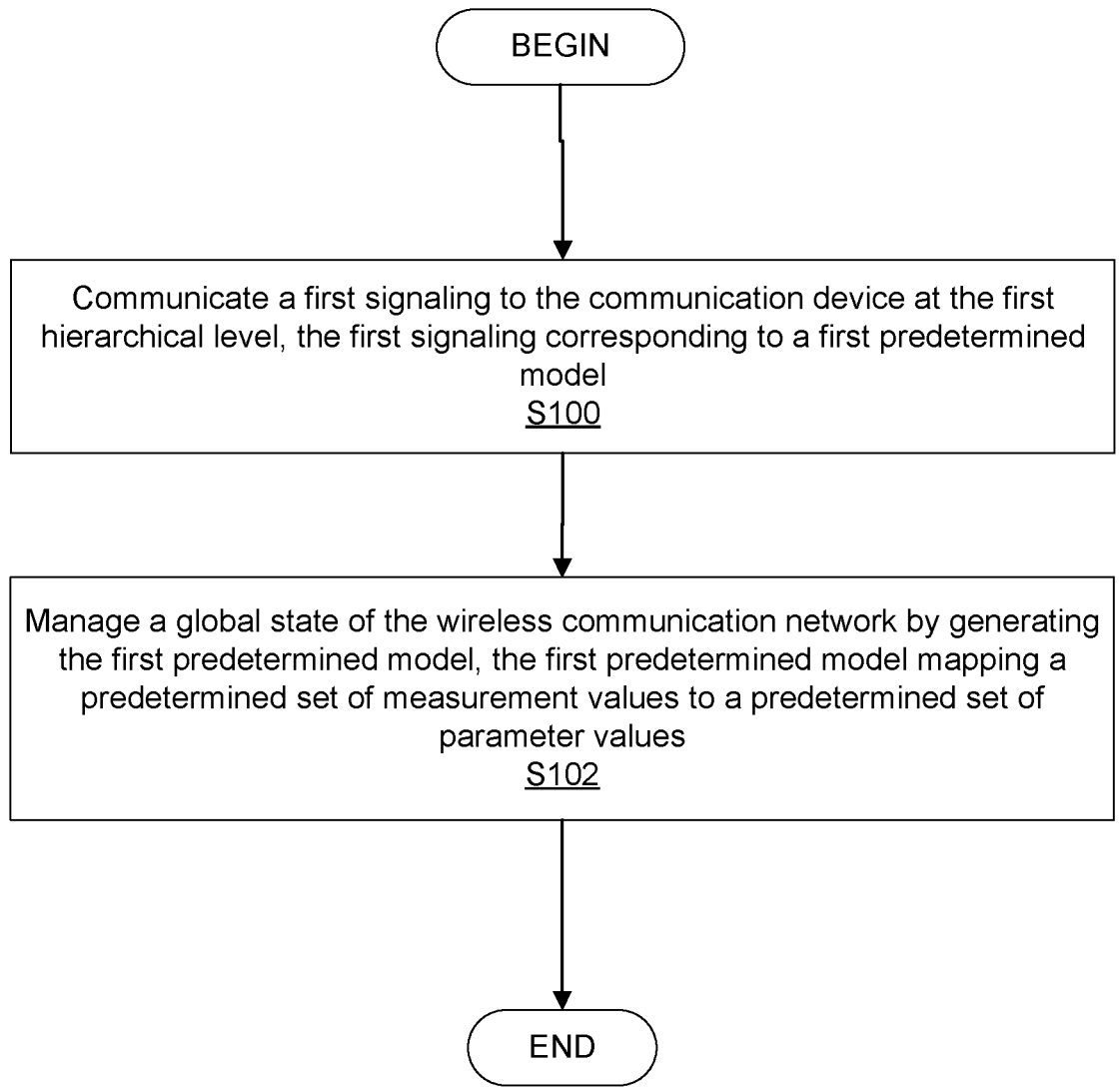
FIG. 3 is a flowchart of an example process in a management node (e.g., network node) for a model setting unit, according to some embodiments of the present disclosure.

FIG. 3 is a flowchart of an example process in a management node 16 according to some embodiments of the present disclosure. The example method is for a management node 16 at a second hierarchical level configured to communicate with a communication device 22 at a first hierarchical level over a wireless communication network, the second hierarchical level being higher than the first hierarchical level. The method includes communicating (Block S100), such as via communication interface 42, a first signaling to the communication device 22 at the first hierarchical level, the first signaling corresponding to a first predetermined model; and managing (Block S102), such as via model setting unit 32, a global state of the wireless communication network by generating the first predetermined model, the first predetermined model mapping a predetermined set of measurement values to a predetermined set of parameter values.

In some embodiments, the method includes generating, such as via model setting unit 32, a second predetermined model based at least in part on a re-evaluation of the first predetermined model. In some embodiments, the method further includes communicating, such as via the communication interface 42, the second predetermined model to the communication device 22 at the first hierarchical level. In some embodiments, the second predetermined model is different from the first predetermined model. In some embodiments, the mapping of the predetermined set of measurement values to the predetermined set of parameter values in the first predetermined model is configured to permit the communication device 22 to set at least one local parameter to at least one parameter value from the predetermined set of parameter values independent of the management node 16. In some embodiments, the first predetermined model is configured to provide at least one output out of a plurality of predetermined outputs based on at least one input, the at least one input corresponding to at least one of the predetermined set of measurement values and the at least one output corresponding to at least one of the predetermined set of parameter values. In some embodiments, the first predetermined model is based on at least one machine learning model. In some embodiments, the at least one machine learning model includes at least one of a decision tree, a random forest, a neural network, a support vector machine, a k-nearest neighbor and a logistic regression.

In some embodiments, the mapping of the predetermined set of measurement values to the predetermined set of parameter values in the first predetermined model is generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model. In some embodiments, the first predetermined model is communicated to the communication device 22, such as via the communication interface 42, as a result of a model evaluation trigger, the model evaluation trigger being at least one of: a time out condition of a periodic timer; a state change of the wireless communication network; and a remote procedure call. In some embodiments, the predetermined set of measurement values includes predetermined channel quality measurement values and the predetermined set of parameter values includes predetermined performance measurement values. In some embodiments, the predetermined performance measurement values include at least one of target block error rate values, radio resource management parameter values and managed object model parameter values. In some embodiments, the management node 16 is a network node. In some embodiments, the first signaling is communicated in a Radio Resource Control, RRC, message and a control plane interface message.

Figure 4:
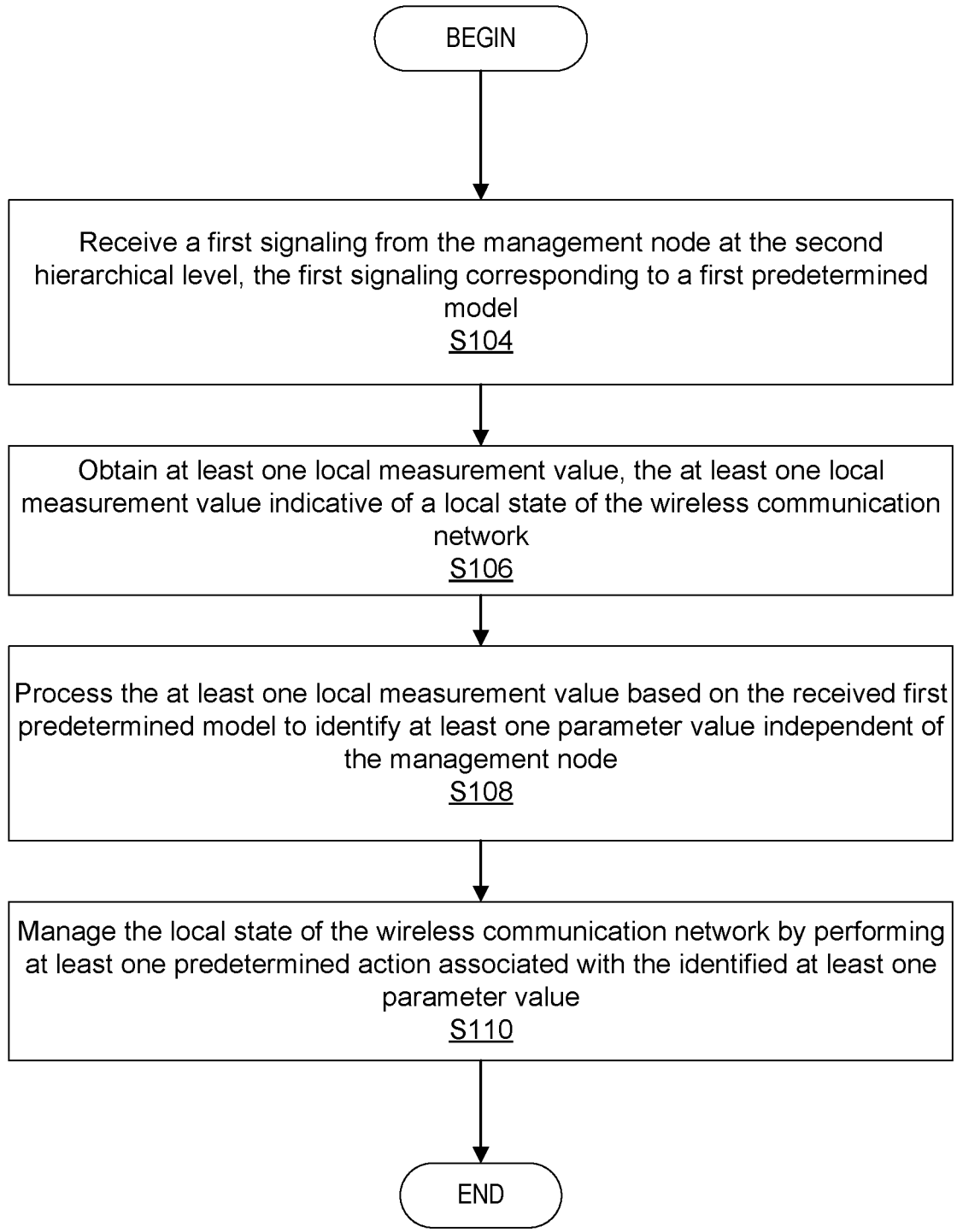
FIG. 4 is a flowchart of an example process in a communication device (e.g., communication device, base station, etc.) to be configured by the management node for a parameter setting unit, according to some embodiments of the present disclosure.

FIG. 4 is a flowchart of an example process in a communication device 22 according to some embodiments of the present disclosure. The example method is for a communication device 22 configured to communicate with a management node 16 over a wireless communication network, the communication device 22 implementing a management function including automated parameter setting at a first hierarchical level of the wireless communication network independent of the management node 16 at a second hierarchical level of the wireless communication network, the second hierarchical level being a higher level than the first hierarchical level. The method includes receiving (Block S104), such as via communication interface 62, a first signaling from the management node 16 at the second hierarchical level, the first signaling corresponding to a first predetermined model. The method includes obtaining (Block S106), such as via communication interface 62, at least one local measurement value, the at least one local measurement value indicative of a local state of the wireless communication network. The method includes processing (Block S108), such as via parameter setting unit 34, the at least one local measurement value based on the received first predetermined model to identify at least one parameter value independent of the management node 16. The method includes managing (Block S110), such as via parameter setting unit 34, the local state of the wireless communication network by performing at least one predetermined action associated with the identified at least one parameter value.

In some embodiments, the first predetermined model maps a predetermined set of measurement values to a predetermined set of parameter values. In some embodiments, the processing the at least one local measurement value further comprises processing, such as via parameter setting unit 34, the at least one local measurement value based on the mapping of the predetermined set of measurement values to the predetermined set of parameter values in the received first predetermined model to identify the at least one parameter value independent of the management node 16. In some embodiments, the at least one predetermined action includes setting at least one corresponding parameter to the identified at least one parameter value. In some embodiments, the at least one predetermined action includes triggering at least one of a remote procedure call, a second predetermined model and communication of an alarm. In some embodiments, the method further includes receiving, such as via communication interface 62, a second signaling, from the management node 16, the second signaling corresponding to a second predetermined model, the second predetermined model based on a re-evaluation of the first predetermined model. In some embodiments, the second signaling is different from the first signaling and the second predetermined model is different from the first predetermined model. In some embodiments, the managing the local state of the wireless communication network further comprises setting, such as via parameter setting unit 34, parameters to parameter values identified independent of the management node 16 and based on the mapping in the first predetermined model until a second predetermined model is received, the second predetermined model being a re-evaluated parameter setting model.

In some embodiments, the method further includes, as a result of a second predetermined model being received, managing, such as via parameter setting unit 34, the local state of the wireless communication network by setting one or more parameter to corresponding parameter values based on a mapping of a predetermined set of measurement values to a predetermined set of parameter values in the received second predetermined model. In some embodiments, the first predetermined model is configured to provide at least one output out of a plurality of predetermined outputs based on at least one input. In some embodiments, the at least one input is the obtained at least one local measurement value and the at least one output is the at least one parameter value identified independent of the management node 16. In some embodiments, the first predetermined model is based on at least one machine learning model. In some embodiments, the at least one machine learning model includes at least one of a decision tree, a random forest, a neural network, a support vector machine, a k-nearest neighbor and a logistic regression. In some embodiments, the at least one machine learning model maps a predetermined set of measurement values to a predetermined set of parameter values, the mapping generated at least in part based on: providing measurement inputs to the at least one machine learning model; the measurement inputs, calculating outputs of the at least one machine learning model; and the outputs of the at least one machine learning model, determining at least one parameter value to be mapped to at least one measurement value in the first predetermined model.

In some embodiments, the first predetermined model is represented by a look-up table. In some embodiments, the first predetermined model is received, such as via communication interface 62, as a result of a model evaluation trigger, the model evaluation trigger being at least one of: a time out condition of a periodic timer; a state change of the wireless communication network; and a remote procedure call. In some embodiments, the at least one local measurement value includes a channel quality measurement value and the identified at least one parameter value (e.g., CQI periodicity, transmission mode, carrier to be used, data priority, etc.) is associated with a performance measurement value. In some embodiments, the at least one parameter value includes at least one of a target block error rate value, a radio resource management parameter value and a managed object model parameter value. In some embodiments, the communication device 22 at the first hierarchical level is a wireless device. In some embodiments, the communication device 22 at the first hierarchical level is a network node. In some embodiments, the first signaling is received in at least one of a Radio Resource Control, RRC, message and a control plane interface message (e.g., NG-c protocol message).

Having described some embodiments of this disclosure for parameter setting in a wireless communication network that may advantageously reduce signaling overhead, feedback delays and/or configurer processing load, a more detailed description of at least some of the embodiments is provided below.

To aid in understandability of the solutions provided in this disclosure, a very specific, non-limiting, example is introduced. In this example, a parameter called the block error rate (BLER) is used to identify an optimal BLER setting for any particular user in the network, at any particular time. Machine models may be used to select the BLER setting given a particular environment. Based on this consideration, a lookup table of measurement values to parameter setting values can be formed, such as, for example, a lookup table of signal-to-interference-plus-noise ratio (SINR) values to target BLER values, as shown below in Table 1. Table 1 shows a "best" or optimal target BLER for certain SINR and Hybrid Automatic Repeat reQuest (HARQ) aggressiveness measurements.

TABLE 1

SINR to target BLER

| SNR value | BLER | HARQ Aggressiveness |
| --- | --- | --- |
| <3.13 | 0.5 | 0.1 |
| <3.38 | 0.3 | 0.1 |
| <10.5 | 0.1 | 0.2 |
| >11.26 | 0.1 | 0.4 |

However, the values in Table 1 may be likely to change for different network environments. Furthermore, there may be other measurements and/or parameters that also impact this BLER parameter setting. Thus, it may not be desirable to hard code this parameter setting information in the lower levels/layers of the communication system 10 since the optimal settings may change for different environments and/or at different times. Furthermore, providing this type of parameter setting information or algorithm in the upper/higher levels/layers would require communication between the higher and lower levels/layers far too frequently to be considered practical. For example, depending on a convergence time of a link adaptation algorithm, the SINR may be required to be measured every 100 milliseconds (ms) to update the target BLER in a useful manner.

Thus, a solution in this disclosure provides a general interface to the lower levels/layers that can maintain sufficient flexibility to be configurable, while also allowing the configuration or parameter setting to be implemented at the lower levels/layers in real-time and/or without the delays associated with the amount of communications (e.g., measurement feedback, parameter setting signaling, etc.) between the higher and lower levels in existing systems. In some embodiments, a model, such as a lookup table or a decision tree, may be generated at the higher levels and signaled to the lower levels (e.g., communication device 22) to allow the lower levels to set the various parameters and manage a local state of the network at that level, independent of the higher level nodes (e.g., the management node 16). In some embodiments, the higher level nodes have access to and/or knowledge of data or observable values that are not known by the lower level nodes. For example, the management node 16 (e.g., ONAP) may have collective data for the network environment (e.g., WDs or multiple RANs) of the lower level nodes, such as, the communication devices 22 that the management node 16 manages, which is not available at the lower level. Thus, it may be advantageous for the management node 16 to generate the model in a manner that allows the communication devices 22 at the lower level to autonomously set the parameters according to the model, independent of the management node 16.

Configuration Formats

Various formats are contemplated for the interface of the present disclosure. In each format, after configuration, the configured box or model may have the same input and outputs. In some embodiments, each configuration or model may have at least the following aspects: input specifications, model definition, actuators, and triggering methods, as explained in more detail below. In some embodiments, each of these aspects may correspond to a separate software module or code segment.

Input Specifications

In some embodiments, input specification may define what measurements the model will use as inputs. For example, for a decision tree, input specifications may define what the decision variables are. In the example herein above with Table 1, for example, an input specification for the model may be SINR or CQI measurements. In some embodiments, measurements for the model can include, for example, averaging measurements in order to avoid overly frequent parameters changes. In one embodiment, the average channel quality index (CQI) feedback for a wireless device may be one input for the model. In some embodiments, a predetermined set of operations could be applied optionally to these inputs (e.g., average, max, min, filtering, or other operations). For example, the above mapping could be based on an exponentially weighted moving average (EWMA) based on a weight configured in the input)

The inputs may be input into the model to generate output parameter values, such as, target BLER values. In some embodiments, parameter names or identifiers (IDs) may be defined by e.g., a Universal Resource Locator/Universal Resource Indicator (URL/URI), or other unique methods (e.g., a fully defined Performance Management (PM) counter, a $3^{rd}$ Generation Partnership Project (3GPP)-defined channel, etc.). In some embodiments, the parameters may be mapped to local variables.

Model Definition

The model definition may define what components or techniques may be used to generate output parameter values and/or how inputs can be mapped to a finite number of outputs as processed, for example, by 'actuators' explained herein below.

In the BLER example, the model is a lookup table/decision tree, which can map an average CQI value to an output parameter BLER value. In other embodiments, other types of models may be defined for use with embodiments of this disclosure, such as, for example, a neural network, a support vector machine (SVM), or other type of machine learning (ML) model.

Actuators

As used herein, the 'actuator' may define the actions that a configurer, such as the communication device 22, can take based on a particular model, such as the model communicated by the management node 16. Some example actions that may be taken can include but are not limited to setting a particular parameter, sending a signal to upper layers, or triggering a remote procedure call (RPC) with the parameter value output.

Some embodiments may include a procedure such as, for example, set method of moments (MOM) parameter to x, raise alarm, call function x, initiate cell handover, etc. Another action may be to trigger other model evaluations. In the BLER example, the action includes setting the BLER target parameter to a valued defined by the model (e.g., the value from the model mapped to a particular measurement value for SINR). In some implementations actuators may be only triggered by particular combinations of inputs. For instance, a model designed to compensate for handover may trigger an alarm only for certain combinations of inputs. In a decision tree or random forest the actuators may be expressed in the final nodes of the tree, with the nodes of the tree indicating which actuators to actuate with what fields to use (i.e. set BLER to 10%). For other models, which actuators to trigger may be based on other fields. For models which act as classifiers then the different classifications may each be associated with different actuators, and actuator fields. For models which act as regressions (i.e., produce a continuous output field such as probability of error, or the predicted velocity of an object), that continuous output may be then passed into a second classifier model (with associated actuators) or have actuators always acted upon with the given inputs.

Triggering Methods

In some embodiments, a triggering feature may determine when (or under what conditions) a particular model should be evaluated or re-evaluated, and possibly have its actuators actuated. Examples of triggers include periodic triggers, triggers at input parameter change, triggers based on a change associated with a threshold, etc. In other embodiments, there may be other types of triggers for a model evaluation and/or re-evaluation.

In some embodiments, a model evaluation and/or re-evaluation may involve providing additional, new, different or more current input measurements to the model (based on data available at the management node 16 at the higher level) to generate updated output parameter values and/or modifying an action to be taken based on changed conditions of the network environment, etc.

Decision Tree Format

In one example embodiment, the model includes and/or is based on a decision tree. This type of model is known in the art and will therefore not be described herein in great detail. In some embodiments, the decision tree may be specified by a series of nodes and leaves. At each internal node (i.e., not the nodes at the ends of the tree) a technique for the algorithm to select one of the nodes' children may be defined. In some embodiments, this is a mathematical function of the various inputs. For example, these can be in a form according to the following table, Table 2.

TABLE 2

| Mathematical functions for inputs. | |
|---|---|
| x operator y | Where operator is *, /, +, −, or %, == and y is numeric (or others) |
| x is y | Where y is a specific type |

In some embodiments, the table above, Table 2, may be implemented using the Predictive Model Markup language (PMML) format defined from a sklearn Python code. Note that this is just one example of how a decision tree could be formatted and other formats are contemplated in other embodiments. For example, any format supported by PMML (or other similar standards) may also be used to implement some embodiments of this disclosure.

In some embodiments, the decision tree may only have a single leaf output. In decision trees, random forests may be used for parameter selection. A random forest is a collection of decision trees where the final decision is an average of all the individual decision trees decisions.

Some embodiments include an additional step to combine the results from the individual leaves into a final decision. One way to handle this is to separate the actuators from the parameter decisions of the decision trees. In other words, the decision tree aspect or feature may be used only for deciding the value of a particular parameter (e.g., BLER), but the usage of that parameter associated with an actuator or a concrete action to be performed, may be implemented as a separate field. In some embodiments, this may be implemented using a Remote Procedural call (RPC), with some fields in the RPC referring to the output of the model. For example, the RPC could be a 'setParameter' function applied locally for a particular user associated with the input measurements.

Alternative embodiments include each leaf being configured to trigger RPCs. For example, alarms could be triggered by some leaves but not for others.

This disclosure contemplates several ways to enable a UE/radio bearer/RAN/eNB/cell-specific parameter setting. In one embodiment, enabling specific parameter setting may include using as an input a form of node identifier (ID). Such node ID may be transparently passed to the RPC for setting. For example, the radio network temporary identifier (RNTI) could be passed into the model. Such ID may then be used to call the RPC. Another embodiment may include automatic scoping. With automatic scoping, particular models may be automatically scoped to refer to a particular parameter set. For example, if a BLER is set by the output of the model and the input measurements are defined with respect to a particular wireless device, the BLER setting would automatically be set for that wireless device. Other embodiments include configurable scoping. With configurable scoping, the scoping is part of the model's configuration. Some embodiments may be implemented using a multiple fields set, and having multiple RPCs.

Model Evaluation Triggering

In order to trigger a model evaluation by the management node 16, several methods may be considered. In one embodiment, the model evaluation and/or re-evaluation may be periodically triggered by, for example, a timeout. In another embodiment, the model evaluation and/or re-evaluation may be triggered as part of a set of predefined state changes. For instance, one state change could be defined for a radio resource control (RRC) connect, at RRC disconnect, at radio link failure, etc. When a state begins or ends, the model evaluation or re-evaluation could be triggered to run. In yet another embodiment, the model evaluation and/or re-evaluation may be triggered by an RPC. This could be triggered from another model evaluation or triggered by higher or lower layers.

Signaling Diagrams
Applied for ONAP

Figure 5:
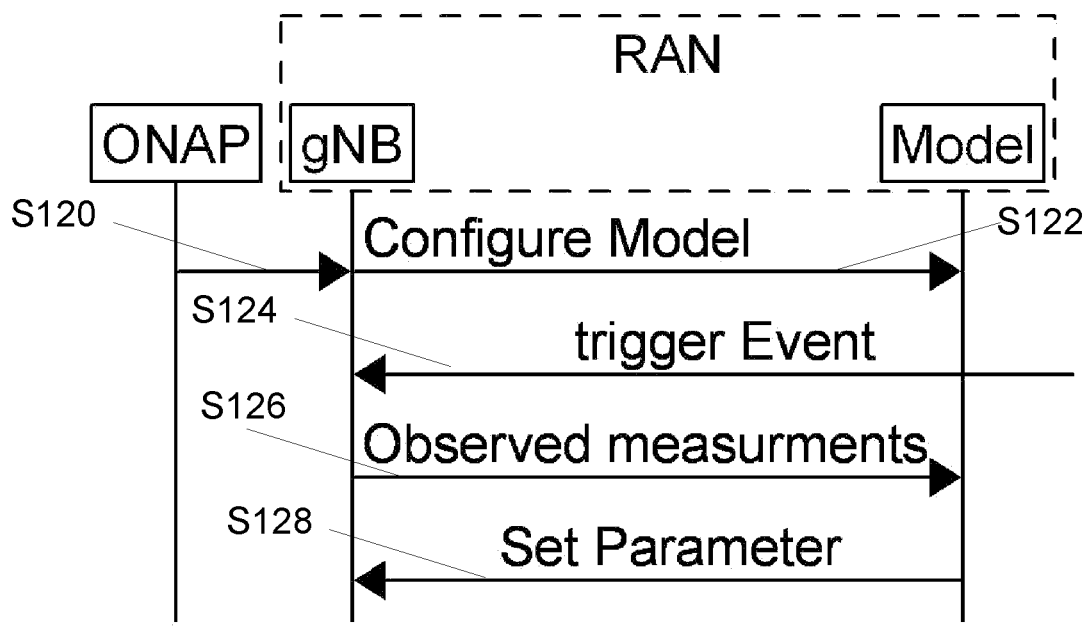
FIG. 5 is a flow diagram of an example process for configuring parameters according to some embodiments of the present disclosure.

Referring to FIG. 5, some of the techniques disclosed herein are illustrated in a flow diagram according to one embodiment, where the management node 16 includes an ONAP and the communication device 22 whose parameters are to be set includes a gNB. The ONAP generates, evaluates and/or re-evaluates the model and sends (Block S120) the updated model to the gNB. The gNB may perform some processing or further configuring on the model. The gNB may then send (Block S122) updated information on the configured model to another RAN component that stores or runs an instance of the model. The model may be stored at the gNB in other embodiments. A triggering event, such as, for example, a state change (e.g., cell handover) for a UE, may be observed by the gNB (Block S124). As a result of the trigger, the gNB may then perform and/or observe measurements (e.g., SINR) and feed the local measurements to the model (Block S126). The model may then output a parameter value (e.g., BLER value) and/or a set parameter command to set the corresponding parameter (e.g., BLER) to the output parameter value (Block S128).

Applied Over-the-Air (OTA)

Figure 6:
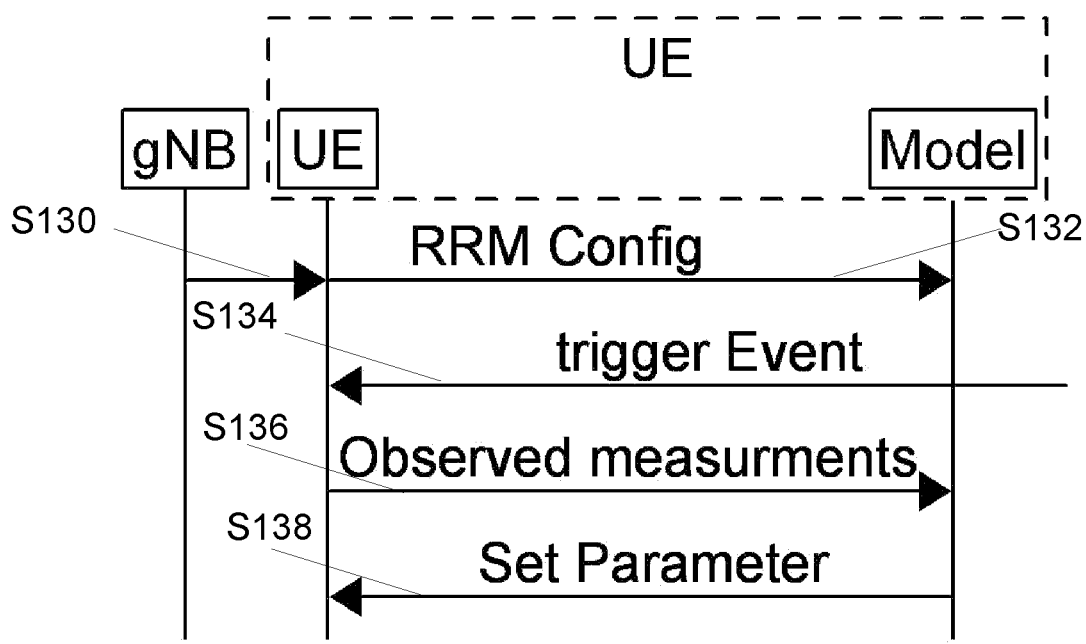
FIG. 6 is a flow diagram of yet another example process for configuring parameters according to some embodiments of the present disclosure.

Referring to FIG. 6, some of the techniques disclosed herein are illustrated in a flow diagram according to an alternative embodiment, where the management node 16 includes a gNB and the communication device 22 whose parameters are to be set includes a UE. The gNB generates, evaluates and/or re-evaluates the model and sends (Block S130) the updated model to the UE, such as, via RRC signaling. The UE may perform some processing or further configuring on the model. The UE may then send (Block S132) updated information (e.g., radio resource management (RRC) configuration information) associated with the model to another component that stores or runs an instance of the model (e.g., the RRC configuration information may be provided to the software component running an instance of the model). A triggering event, such as, for example, a state change (e.g., RRC connect), may be observed by the UE (Block S134). As a result of the trigger, the UE may then perform and/or observe measurements (e.g., SINR) and feed the local measurements to the model (Block S136). The model may then output a parameter value (e.g., BLER value) and/or a set parameter command to set the corresponding parameter (e.g., BLER) to the output parameter value (Block S138).

In other embodiments, the techniques disclosed herein for a multi-level network could be applied to other devices, nodes and systems, such as, for example, a software-defined network (SDN) router and other nodes.

Accordingly, some embodiments of this disclosure permit a configurer (e.g., configuration or management node, etc.) to communicate to a communication device (e.g., UE, base station, etc.) to be configured an indication or model informing the communication device that if you observe X (e.g., local measurement), do Y (e.g., set parameter autonomously to a particular value based on observed X). These techniques may advantageously allow for greater control of fine grained parameters without large signaling, high processing load, or large delay, as compared to existing parameter setting techniques.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A communication device configured to communicate with a management node over a wireless communication network, the communication device implementing a management function including automated parameter setting at a first hierarchical level of the wireless communication network independent of the management node at a second hierarchical level of the wireless communication network, the second hierarchical level being a higher level than the first hierarchical level, the communication device comprising:
   a communication interface configured to receive a first signaling from the management node at the second hierarchical level, the first signaling corresponding to a first predetermined model; and
   processing circuitry in communication with the communication interface, the processing circuitry configured to:
      obtain at least one local measurement value, the at least one local measurement value indicative of a local state of the wireless communication network;
      process the at least one local measurement value based on the first predetermined model to identify at least one parameter value independent of the management node;
      manage the local state of the wireless communication network by performing at least one predetermined action associated with the identified at least one parameter value; and
      receive a second signaling, from the management node, the second signaling corresponding to a second predetermined model, the second predetermined model based on a re-evaluation of the first predetermined model.

2. A method for a communication device configured to communicate with a management node over a wireless communication network, the communication device implementing a management function including automated parameter setting at a first hierarchical level of the wireless communication network independent of the management node at a second hierarchical level of the wireless communication network, the second hierarchical level being a higher level than the first hierarchical level, the method comprising:
   receiving a first signaling from the management node at the second hierarchical level, the first signaling corresponding to a first predetermined model;
   obtaining at least one local measurement value, the at least one local measurement value indicative of a local state of the wireless communication network;
   processing the at least one local measurement value based on the first predetermined model to identify at least one parameter value independent of the management node;

managing the local state of the wireless communication network by performing at least one predetermined action associated with the identified at least one parameter value; and receiving a second signaling, from the management node, the second signaling corresponding to a second predetermined model, the second predetermined model based on a re-evaluation of the first predetermined model.

3. The method of claim 2, wherein the first predetermined model maps a predetermined set of measurement values to a predetermined set of parameter values.

4. The method of claim 3, wherein the processing the at least one local measurement value further comprises processing the at least one local measurement value based on the mapping of the predetermined set of measurement values to the predetermined set of parameter values in the first predetermined model to identify the at least one parameter value independent of the management node.

5. The method of claim 2, wherein the at least one predetermined action includes at least one of:
setting at least one corresponding parameter to the identified at least one parameter value; and
triggering at least one of a remote procedure call, a second predetermined model and communication of an alarm.

6. The method of claim 2, wherein the second signaling is different from the first signaling and the second predetermined model is different from the first predetermined model.

7. The method of claim 3, wherein the managing the local state of the wireless communication network further comprises setting parameters to parameter values identified independent of the management node and based on the mapping in the first predetermined model until a second predetermined model is received, the second predetermined model being a re-evaluated parameter setting model.

8. The method of claim 3, further comprising, as a result of a second predetermined model being received, managing the local state of the wireless communication network by setting one or more parameter to corresponding parameter values based on a mapping of a predetermined set of measurement values to a predetermined set of parameter values in the received second predetermined model.

9. The method of claim 2, wherein the first predetermined model is configured to provide at least one output out of a plurality of predetermined outputs based on at least one input.

10. The method of claim 9, wherein the at least one input is the obtained at least one local measurement value and the at least one output is the at least one parameter value identified independent of the management node.

11. The method of claim 2, wherein the first predetermined model is based on at least one machine learning model.

12. The method of claim 11, wherein the at least one machine learning model includes at least one of a decision tree, a random forest, a neural network, a support vector machine, a k-nearest neighbor and a logistic regression.

13. The method of claim 11, wherein the at least one machine learning model maps a predetermined set of measurement values to a predetermined set of parameter values, the mapping generated at least in part based on:
providing measurement inputs to the at least one machine learning model;
the measurement inputs, calculating outputs of the at least one machine learning model; and
the outputs of the at least one machine learning model, determining at least one parameter value to be mapped to at least one measurement value in the first predetermined model.

14. The method of claim 2, wherein the first predetermined model is represented by a look-up table.

15. The method of claim 2, wherein the first predetermined model is received as a result of a model evaluation trigger, the model evaluation trigger being at least one of:
a time out condition of a periodic timer;
a state change of the wireless communication network; and
a remote procedure call.

16. The method of claim 2, wherein the at least one local measurement value includes a channel quality measurement value and the identified at least one parameter value is associated with a performance measurement value.

17. The method of claim 16, wherein the at least one parameter value includes at least one of a target block error rate value, a radio resource management parameter value and a managed object model parameter value.

18. The method of claim 2, wherein the communication device at the first hierarchical level is one of a wireless device and a network node.

19. The method of claim 2, wherein the first signaling is received in at least one of a Radio Resource Control, RRC, message and a control plane interface message.

* * * * *